United States Patent
Becher et al.

(10) Patent No.: US 7,336,947 B2
(45) Date of Patent: Feb. 26, 2008

(54) METHOD FOR PROVIDING SOFTWARE IN RADIO-BASED CELLULAR COMMUNICATION NETWORKS, AND A COMMUNICATION NETWORK FOR IMPLEMENTING THE METHOD

(75) Inventors: Reinhard Becher, Munich (DE); Markus Dillinger, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 566 days.

(21) Appl. No.: 10/333,248

(22) PCT Filed: Jul. 19, 2001

(86) PCT No.: PCT/DE01/02731

§ 371 (c)(1),
(2), (4) Date: Jan. 17, 2003

(87) PCT Pub. No.: WO02/07466

PCT Pub. Date: Jan. 24, 2002

(65) Prior Publication Data

US 2003/0153303 A1    Aug. 14, 2003

(30) Foreign Application Priority Data

Jul. 19, 2000  (DE) ................. 100 35 309
Aug. 11, 2000  (DE) ................. 100 39 420

(51) Int. Cl.
*H04M 3/00* (2006.01)
*H04B 7/00* (2006.01)
*G06F 9/445* (2006.01)

(52) U.S. Cl. ............... 455/419; 455/41.2; 379/201.05; 717/172; 717/177; 705/500

(58) Field of Classification Search ........... 379/201.05; 455/41.1–41.3, 67.11, 418–420; 717/168–178; 705/500
See application file for complete search history.

(56) References Cited

U.S. PATENT DOCUMENTS 6,023,620 A * 2/2000 Hansson ................ 455/419
6,031,830 A    2/2000 Cowan (Continued)

FOREIGN PATENT DOCUMENTS

EP    583 077    2/1994

(Continued)

*Primary Examiner*—Lester G. Kincaid
*Assistant Examiner*—Matthew C Sams
(74) *Attorney, Agent, or Firm*—Staas & Halsey LLP

(57) ABSTRACT

Software is provided in a radio-based cellular communication networks by a subscriber station, which is checked into a cell and which contains software that can be provided. The subscriber station notifies a storage device of the cell that the software is available in the cell. The storage device then sends a message concerning the availability of the software to all of the subscriber stations checked into the cell. Another subscriber station, which is checked into the cell, can request the software by sending a message with a limited transmitting power so that the message can only be received by subscriber stations located at a distance from the requesting subscriber station that is small compared to the diameter of the cell. When the subscriber station storing the software has received the message sent by the requesting subscriber station, the software is immediately transmitted from that subscriber station to the requesting subscriber station.

10 Claims, 3 Drawing Sheets

U.S. PATENT DOCUMENTS

| | | | |
|---|---|---|---|
| 6,052,600 A * | 4/2000 | Fette et al. | 455/509 |
| 6,144,992 A * | 11/2000 | Turpin et al. | 709/208 |
| 6,456,234 B1 * | 9/2002 | Johnson | 342/357.09 |
| 6,697,649 B1 * | 2/2004 | Bennett et al. | 455/574 |
| 6,810,428 B1 * | 10/2004 | Larsen et al. | 709/238 |
| 6,941,270 B1 * | 9/2005 | Hannula | 705/1 |

FOREIGN PATENT DOCUMENTS

| | | |
|---|---|---|
| EP | 0 959 635 A1 | 11/1999 |
| WO | 00/79818 | 12/2000 |

* cited by examiner

● NE
△1 TNR 1

● NE
△x TNR 1...4

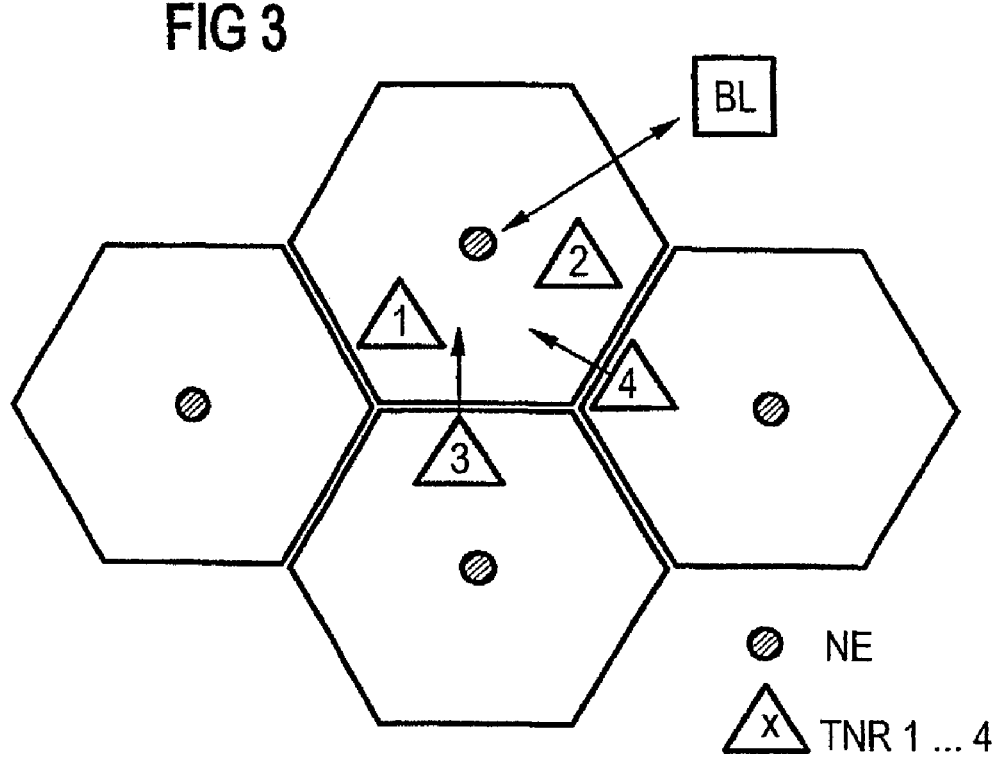
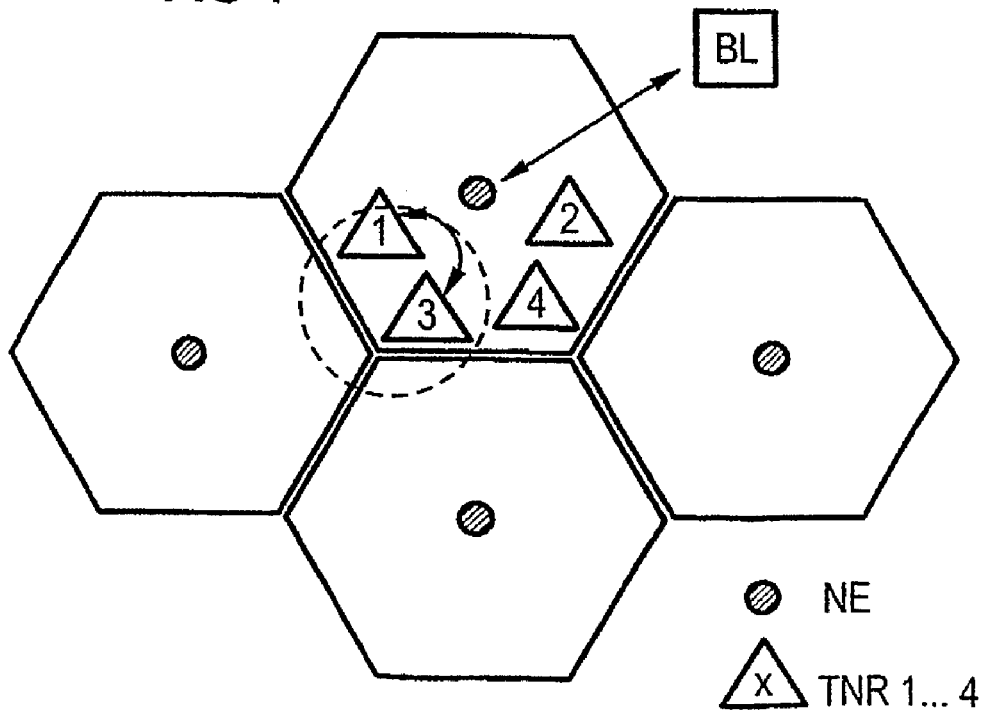

◉ NE

△x TNR 1... 4

---▶ Message indicating that the software is available

◄──▶ Transmission of the software

METHOD FOR PROVIDING SOFTWARE IN RADIO-BASED CELLULAR COMMUNICATION NETWORKS, AND A COMMUNICATION NETWORK FOR IMPLEMENTING THE METHOD

CROSS REFERENCE TO RELATED APPLICATIONS

This application is based on and hereby claims priority to German Application No. 100 35 309.6 filed on Jul. 19, 2000 and German Application No. 100 39 420.5 filed on Aug. 11, 2000, the contents of which are hereby incorporated by reference.

BACKGROUND OF THE INVENTION

1. Field of the Invention

The invention relates to a method for providing software in radio-based cellular communication networks, and a communication network for implementing the method.

2. Description of the Related Art

In today's computer networks, a client-server structure is frequently used to provide new software, and this is generally also referred to as a software upgrade. This is characterized by a hierarchical structure, whereby the software is stored on a higher-order "server" computer, which, at the request of "client" computers connected to the server, provides the latter with the required software.

On the basis of this fundamental model, which is also referred to as a single-server architecture, further variants exist, in which e.g. a plurality of servers process requests from a multiplicity of lower-order clients (multi-server architecture). For temporary storage of the software, "proxy servers" can also be used, which are disposed in the hierarchy between the client and server. The software requested by a client is temporarily stored in the proxy server in this architecture, so that, when a new request is received from a different client, the software can be requested directly from the proxy server (which is normally located in physically closer proximity). This method is used, for example, on the Internet for temporary storage of frequently requested web pages.

In radio-based cellular communication networks, such as the existing GSM (Global System Mobile) network, or the planned UMTS (Universal Mobile Telecommunication System) network as a third-generation mobile network, software upgrades need to be carried out, e.g. an upgrade of a WAP (Wireless Application Protocol) browser. Here, the software can be provided by the manufacturer of a subscriber station, by a network operator or by an independent service provider.

If one of the aforementioned client-server architectures is used for the software upgrade, in which the software is stored centrally on servers in the mobile network and is transmitted from there to each individual subscriber station, this nevertheless produces unacceptable waiting times given the large number of subscriber stations. A model calculation can explain this:

A maximum of 6 minutes is to be taken to download new software. For this purpose, 100 servers are available, which are intended to distribute the software among 10 million subscriber stations. With sequential processing, the software download to all subscriber stations requires 10,000,000*6 min./100 servers=10,000 hours>1 year.

Even with an increase in the number of servers to 1000, the software upgrade would still require around 1.5 months in the most favorable case. However, an increase in the number of servers incurs substantial costs and is therefore uneconomical.

Furthermore, in mobile communication networks, in contrast to a fixed network, no allocation of a subscriber station to a network connection is possible. Consequently, in the case of central provision of software by a higher-order server (e.g. in the GSM network by a base station), each subscriber station of the communication network must poll the relevant server at regular time intervals in order to determine whether new software is available for downloading. This generates an additional load.

SUMMARY OF THE INVENTION

An object of the invention is therefore to produce a method for providing software in radio-based cellular communication networks which enables short transmission times with simultaneously low costs.

This object is achieved by a method for providing software in radio-based cellular communication networks, in which:

- a subscriber station which has stored the software to be provided and is registered with a cell of the communication network notifies a storage device of the cell of the availability of the software in the cell and the storage device creates a record of the software availability,
- a network device sends a message indicating the availability of the software to the subscriber stations registered with the cell,
- a further subscriber station registered with the cell requests the software by sending a message, whereby the message is transmitted with a limited transmit power so that the message can only be received by subscriber stations which are at a distance from the transmitting subscriber station which is short compared with the diameter of the cell, and
- the software is transmitted directly from the subscriber station to the further subscriber station when the subscriber station has received the message transmitted by the further subscriber station. communication network according to claim 8. Advantageous designs form the subject-matter of dependent claims.]

The method according to the invention offers in particular the following advantages:

1. The software upgrade is carried out in the manner of a "snowball" system. Each subscriber station which is registered with a cell and has stored the software can transmit the software to further subscriber stations registered with the cell. Each subscriber station is therefore both a client and a server. Through the direct transmission of the software from one subscriber station to one or more further subscriber stations, virtually exponential distribution of the software can be achieved. Correspondingly, the time taken to make the software available to all subscriber stations registered with a cell can be reduced by a multiple.

2. Resources are saved compared with a hierarchical client-server system, since, at the beginning of the method, the software can be transmitted from only one server to one subscriber station of the communication network, which can then forward the software to the other subscriber stations of the communication network.

3. Since the software can be transmitted directly from one subscriber station to a further subscriber station, and a network device performs signaling tasks only, resources are additionally saved.

It is furthermore particularly advantageous if the message requesting the software is repeated at least once by the subscriber station. Due to the mobility of the subscriber stations it is possible that, when a first request is made for the software available in the cell, no subscriber station which has stored the software is located in physical proximity to the requesting subscriber station. However, with a repeat transmission of the message requesting the software, a subscriber station may then be located in the vicinity of the requesting subscriber station, so that the transmission can be initiated.

It is also advantageous for the transmit power to be increased in steps up to its limit with each transmission of the message requesting the software. Resources are saved by reducing the transmit power at the beginning. The range of the transmitter can simultaneously be extended by increasing the transmit power with each transmission of the message, so that a greater number of adjacent subscriber stations can be reached. The probability of thus reaching a subscriber station which is carrying the software to be distributed is thereby increased.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 is a schematic diagram showing the entry into the cell of two subscriber stations which are not carrying the software to be provided, FIG. 4 is a schematic diagram showing the transmission of the software from one subscriber station to another, adjacent subscriber station.

DETAILED DESCRIPTION OF THE PREFERRED EMBODIMENT

Figure 1:
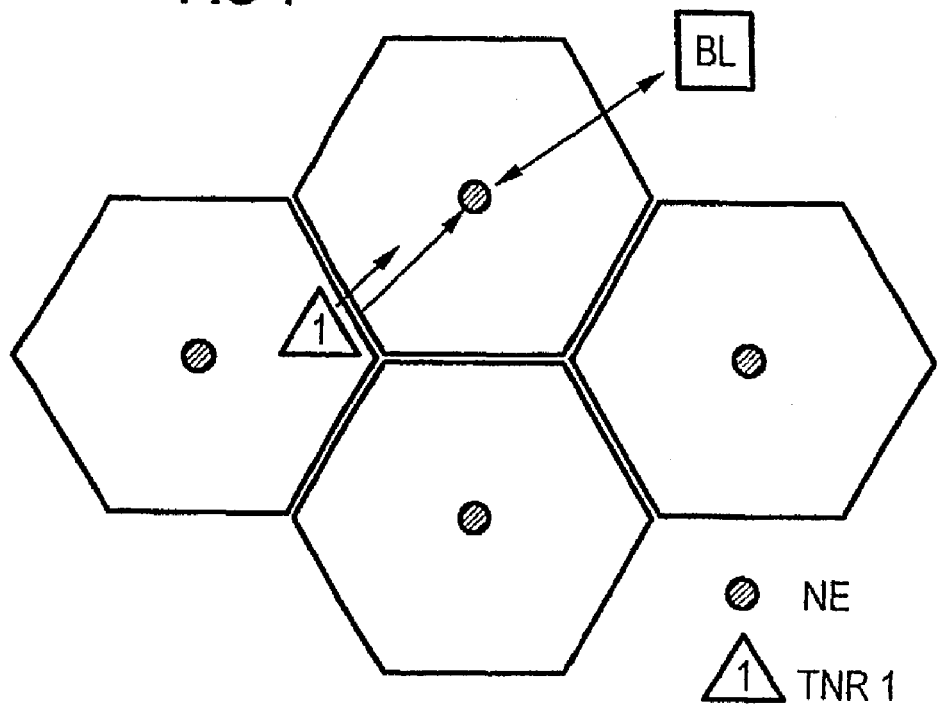
FIG. 1 is a schematic diagram showing the indication of the availability of software by a subscriber station registered with a cell with a storage device of the same cell.

Reference will now be made in detail to the preferred embodiments of the present invention, examples of which are illustrated in the accompanying drawings, wherein like reference numerals refer to like elements throughout.

FIG. 1 schematically shows a section of a cellular communication network with four cells Z. In simple terms, each cell Z has a honeycomb shape. A network device BS is disposed in each case centrally in the cells Z to perform a radio operation with subscriber stations TNR in the cell Z. In the context of this invention, a subscriber station TNR includes a multiplicity of widely differing terminal devices, e.g. mobile telephones, printers, pagers, etc.

Software which is to be provided is stored in a subscriber station TNR1. The software may have been transmitted to the subscriber station TNR1, for example, from a server located inside the communication network or outside the network. When the subscriber station TNR1 changes over from one cell Z into a new cell ZNEU, as shown in FIG. 1, the subscriber station TNR1 informs a storage device BL of the cell ZNEU that the software is available to the subscriber stations TNR within the cell ZNEU. To do this, the subscriber station TNR1 sends a message to the storage device BL, notifying it that the software is available. The storage device BL manages this information in a suitable manner, e.g. as an entry in an updateable table. According to the invention, the entry contains at least information relating to the type of software provided; in addition, however, a link can also be set up to an address which identifies the subscriber station TNR1.

Next, the network device BS notifies the subscriber stations TNR of the cell ZNEU via a transmission channel (e.g. BCCH) that the software is available in the cell ZNEU. Furthermore, signaling information is also transmitted. The notification indicates, for example, the physical transmission channel on which and the maximum transmit power with which the subscriber stations TNR may request the software.

Figure 2:
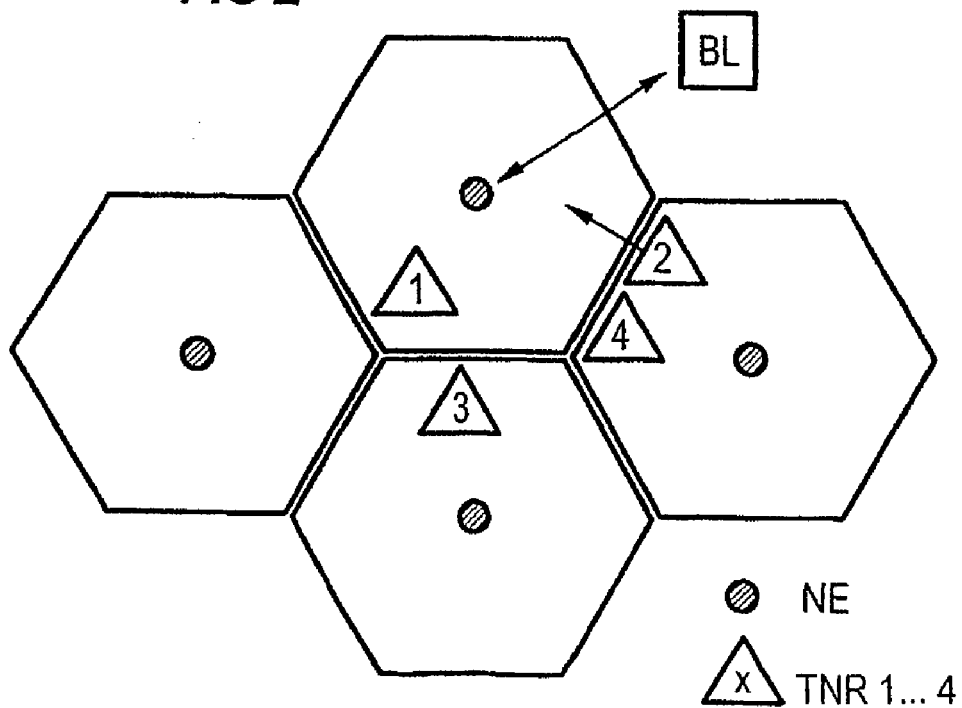
FIG. 2 is a schematic diagram showing the entry into the cell of a subscriber station which is also carrying the software to be provided.

If a further subscriber station TNR2 transfers into the cell ZNEU, as shown in FIG. 2, the subscriber station TNR2 compares its own software with the entries in the storage device BL in terms of the software stored in the cell ZNEU. If the subscriber station TNR2 establishes that an entry relating to the availability of its own software already exists in the storage device BL and the software is consequently available in the cell ZNEU, a link can be set up according to the invention between the existing entry and the subscriber station TNR2. If links of this type are not available in the storage device BL, no further action is taken.

Subscriber stations TNR3 and TNR4, which move into the cell ZNEU, as shown in FIG. 3, receive the message from the network device BS relating to the software available in the cell ZNEU. By comparing the software available in the cell ZNEU with the software stored in the subscriber stations TNR3 and TNR4, the subscriber stations TNR3 and TNR4 in each case establish that they need this software, for example for an upgrade.

The subscriber station TNR3 requests the software via a cell-specific transmission channel, e.g. the RACH (Random Access Channel, GSM network). To do this, the subscriber station TNR3 sends a message NR2 with a limited transmit power, whereby the message NR2 is directed to the further subscriber stations TNR in the cell. The transmit power is preferably selected in such a way that only subscriber stations TNR adjacent to the subscriber station TNR3 can receive the message NR2. In particular, a transmit radius of the subscriber station TNR3 for transmission of the message NR2 is less than half the cell radius. Only subscriber stations TNR located within a range of around 20 m of the subscriber station TNR3 can preferably receive the message. If no subscriber station which can provide the requested software is located within this range, the message NR2 can be repeated once or several times. The method according to the invention simultaneously provides that the transmit power can be increased with each repetition of the message NR2, until the transmit power attains a maximum value. In this way, the transmit radius is increased with each transmission of the message NR2, thereby increasing the probability that subscriber stations TNR which can provide the requested software are located within the transmit radius.

The software can be transmitted subsequently as illustrated in FIG. 4 directly from the subscriber station TNR to the subscriber station TNR3 with no intermediate switching by a network device, e.g. the base station. This procedure is preferably applied if the subscriber stations TNR and TNR3 operate independently from the network, as defined, for example, by the "Bluetooth" standard.

It is also possible to set up a transmission connection between the two subscriber stations TNR and TNR3 through the intermediate switching of the network device NE. To do this, the network device NE performs the transmission connection signaling, while the software can be transmitted directly from the subscriber station TNR to the subscriber station TNR3. This variant is appropriately selected if the subscriber stations TNR are under the responsibility of the communication network. An example of this is provided by the "direct mode" for the HIPERLAN standard.

An example of the set-up of a transmission connection of the "direct mode" type between two subscriber stations TNRA and TNRB may appear as follows:

A subscriber station TNRA, wishing to set up a direct transmission connection to a further subscriber station TNRB, sends a limited-power signal via a cell-specific transmission channel, e.g. the RACH (GSM network). The transmit power can be defined here as the maximum or as a fixed transmit power. The subscriber station TNRA defines its own transmit radius by limiting the transmit power below the defined maximum. This is particularly advantageous if only specific, adjacent subscriber stations are to be addressed.

In order to request software or to request general data, the subscriber station TNRA generates a message NR2, with which the subscriber stations TNR in the cell are notified of the software which the subscriber station TNRA is requesting. To do this, the subscriber stations TNR must poll the transmission channel RACH and perform a comparison to establish whether the requested software matches their own stored software. If no subscriber station TNR responds after a defined time, the message NR2 is repeated. A subscriber station TNRB which receives the message NR2 and can provide the required software notifies receipt of the message NR2 and its content to the network device NE. The network device NE then signals the set-up of a transmission connection between the subscriber station TNRA and the first subscriber station TNR to signal receipt of the message NR2 from the network device NE.

If no subscriber station TNR which is carrying the software is available within the transmit radius of the subscriber station TNR3 at the time of the request of the message NR2, the subscriber station TNR3 can, according to the invention, request the software from the network device NE via a suitable transmission channel. Addresses of a server, for example, which provides the software, are stored in the storage device BL, or a record is held of the subscriber stations TNR which are registered with the cell and which are carrying the software to be provided. With the aid of these entries in the storage device BL, the network device NE then initiates transmission of the software from the server or the subscriber station TNR to the subscriber station TNR3 requesting the software.

Figure 5:
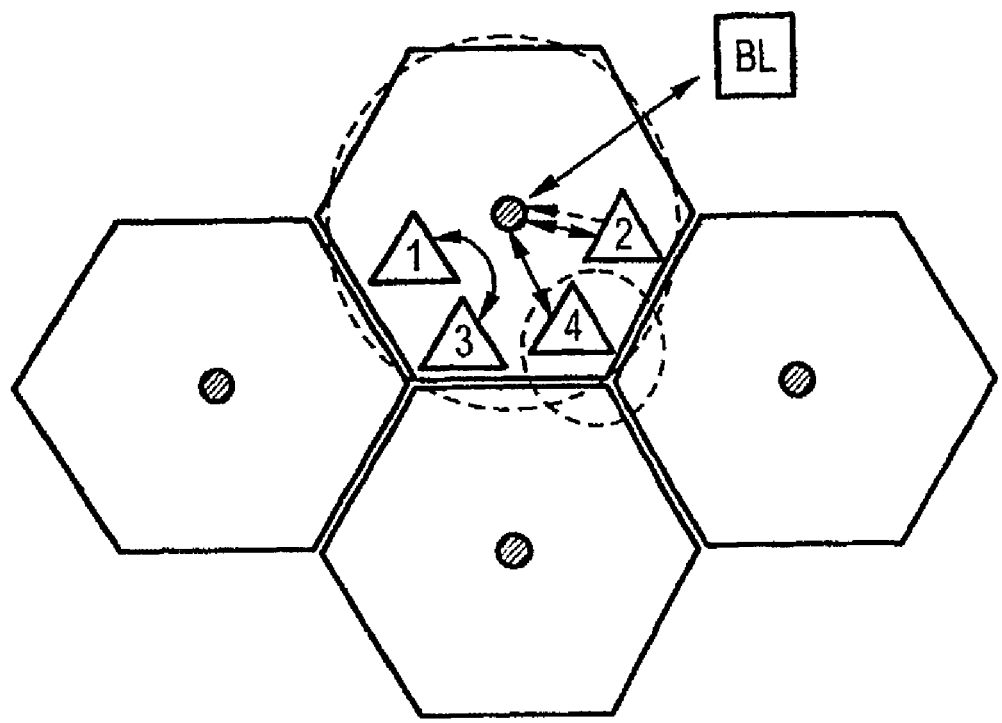
FIG. 5 is a schematic diagram showing the provision of the software to a subscriber station by a network device.

According to a further variant of the invention (FIG. 5), following a request by the subscriber station TNR4 for the software from the network device NE, the network device NE can carry out cell-wide paging of all subscriber stations TNR concerning the requested software. If a subscriber station TNR2 which is carrying the software reports to the network device NE, the network device NE then sets up a connection between the subscriber station TNR2, the network device NE and the requesting subscriber station TNR4 to transmit the software.

If no subscriber station TNR which is carrying the requested software is now located in the cell, the network device NE sets up a connection to a server which has stored the software. The server may be located inside or outside the communication network. The server may be allocated to a service provider, a manufacturer or a network operator.

The invention has been described in detail with particular reference to preferred embodiments thereof and examples, but it will be understood that variations and modifications can be effected within the spirit and scope of the invention.

The invention claimed is:

1. A method for providing software in radio-based cellular communication networks, comprising:
   sending a notification regarding availability of software in a cellular base station of a communication network to a storage device of the cellular base station from a first subscriber station registered with the cellular base station and storing software to be provided;
   creating a record of availability of the software by the storage device after the notification is sent;
   sending a software available message indicating the availability of the software from a network device to subscriber stations registered with the cellular base station after creating the record of availability of the software;
   sending a software request message from a second subscriber station registered with the cellular base station to request the software after sending the software available message; and
   transmitting the software directly from the first subscriber station to the second subscriber station when the first subscriber station receives the software request.

2. The method as claimed in claim 1, further comprising:
   sending a receipt confirmation from the first subscriber station to the network device; and
   setting up a connection by the network device to transmit the software between the first subscriber station and the second subscriber station.

3. The method as claimed in claim 2, further comprising resending the software request message at least once by the second subscriber station if the connection between the first and second subscriber stations fails.

4. The method as claimed in claim 3, further comprising deleting the record indicating software availability stored by the storage device after a predefined time.

5. The method as claimed in claim 4, further comprising storing in the storage device an expiration date relating to the software available for transmission to the subscriber stations of the communication network.

6. The method as claimed in claim 5, further comprising:
   sending an exit notification from the first subscriber station to the storage device upon leaving the cellular base station with which it is registered; and
   updating the record by the storage device to indicate that the software is no longer available for transmission from the first subscriber station.

7. The method as claimed in claim 1, further comprising:
   using a transmit power limited so that the message can only be received by the subscriber stations located at a distance from the second subscriber station which is short compared with a diameter of the cell.

8. The method as claimed in claim 7, wherein said resending includes increasing the transmit power in steps each time, until a maximum transmit power is attained.

9. A communication network providing software to subscriber stations registered in a cellular base station, comprising:
   a first subscriber station registered with the cellular base station of said communication network, to send a notification regarding availability of the software stored in the first subscriber station;

a storage device of the cellular base station to receive the notification and to create a record of availability of the software in the cell after the notification is sent;

a network device to send a software available message indicating the availability of the software to the subscriber stations registered with the cellular base station after creating the record of availability of the software; and a second subscriber station registered with the cellular base station, to send a software request message requesting the software after sending the software available message, said first subscriber station transmitting the software directly to said second subscriber station when said first subscriber station receives the software request message.

10. The method as claimed in claim 9, wherein the second subscriber station registered with the cell sends the software request message requesting the software by using a limited transmit power so that the message can only be received by the subscriber stations located at a distance from the second subscriber station which is short compared with a diameter of the cell.

* * * * *